(12) United States Patent
Muenter et al.

(10) Patent No.: US 9,404,019 B2
(45) Date of Patent: Aug. 2, 2016

(54) AQUEOUS POLYURETHANE-POLYUREA DISPERSIONS

(71) Applicant: Stahl International BV, Waalwijk (NL)

(72) Inventors: Juergen Muenter, Fellbach (DE); Thomas Fischer, Beuren (DE)

(73) Assignee: STAHL INTERNATIONAL B.V., Waalwijk (NL)

( * ) Notice: Subject to any disclaimer, the term of this patent is extended or adjusted under 35 U.S.C. 154(b) by 0 days.

(21) Appl. No.: 14/792,458

(22) Filed: Jul. 6, 2015

(65) Prior Publication Data

US 2015/0307741 A1    Oct. 29, 2015

Related U.S. Application Data

(63) Continuation of application No. 13/698,874, filed as application No. PCT/EP2011/002098 on Apr. 27, 2011, now abandoned.

(30) Foreign Application Priority Data

May 25, 2010 (DE) .......................... 10 2010 021 465

(51) Int. Cl.

| C08G 18/00 | (2006.01) |
|---|---|
| C09D 175/06 | (2006.01) |
| C08G 18/38 | (2006.01) |
| C08G 18/36 | (2006.01) |
| C08G 18/44 | (2006.01) |
| C08G 18/61 | (2006.01) |
| C08G 18/66 | (2006.01) |
| C08G 18/75 | (2006.01) |
| C09D 175/04 | (2006.01) |
| C14C 11/00 | (2006.01) |
| C08L 75/12 | (2006.01) |
| C09D 175/12 | (2006.01) |

(52) U.S. Cl.
CPC .............. *C09D 175/06* (2013.01); *C08G 18/36* (2013.01); *C08G 18/3893* (2013.01); *C08G 18/3897* (2013.01); *C08G 18/44* (2013.01); *C08G 18/61* (2013.01); *C08G 18/6659* (2013.01); *C08G 18/755* (2013.01); *C08L 75/12* (2013.01); *C09D 175/04* (2013.01); *C09D 175/12* (2013.01); *C14C 11/006* (2013.01); *Y10T 428/31558* (2015.04)

(58) Field of Classification Search
CPC .............. C08G 18/61; C08G 18/3893; C08G 18/3897; C09D 175/06; C14C 11/006
See application file for complete search history.

(56) References Cited

U.S. PATENT DOCUMENTS

| 4,599,438 A | 7/1986 | White et al. |
|---|---|---|
| 4,839,443 A | 6/1989 | Akutsu et al. |
| 5,385,999 A | 1/1995 | D'Anvers et al. |
| 5,952,444 A | 9/1999 | Ayama |
| 6,171,515 B1 | 1/2001 | Evans et al. |
| 6,737,069 B1 | 5/2004 | Asaoka et al. |
| 2003/0105219 A1 | 6/2003 | Schutze et al. |
| 2011/0091712 A1 | 4/2011 | Muenter |
| 2013/0078474 A1 | 3/2013 | Muenter et al. |

FOREIGN PATENT DOCUMENTS

| DE | 3730780 | 3/1989 |
|---|---|---|
| DE | 4022539 | 1/1992 |
| DE | 4328917 | 3/1995 |
| DE | 19649953 | 6/1998 |
| DE | 10122444 | 11/2002 |
| DE | 102004002526 | 8/2005 |
| DE | 102004040266 | 2/2006 |
| DE | 102006036220 | 2/2008 |
| EP | 0622378 | 4/1994 |
| EP | 2067803 | 6/2009 |
| EP | 1582542 | 10/2015 |
| WO | 2005/078182 | 8/2005 |
| WO | 2009/144157 | 12/2009 |
| WO | 2011/147519 | 12/2011 |

OTHER PUBLICATIONS

Chen, et al., "Study on Siloxane-Modified Polyurethane Dispersions from Various Polydimethylsiloxanes", Journal of Polymer Science: Part A: Polymer Chemistry, vol. 43, 2005, 3482-3490.

Dieterich, "Aqueous Emulsions, Dispersions and Solutions of Polyurethanes; Synthesis and Properties", Progress in Organic Coatings vol. 9, 1981, 281-340.

Friederichs, "Polyurethanes", Ullmann's Encyclopedia of Industrial Chemistry, Copyright 2005 by Wiley-VCH Verlag GmbH & Co. KGaA, 2005, 1-23.

*Primary Examiner* — Michael L Leonard
(74) *Attorney, Agent, or Firm* — Peacock Myers, P.C.; Jeffrey D. Myers

(57) ABSTRACT

The invention relates to a method for producing aqueous polyurethane-polyurea dispersions, where A) first a polyurethane prepolymer containing NCO groups is produced by reacting A1) polyisocyanates with A2) polymeric polyols and/or polyamines having number-average molecular weights of more than 400 to 8,000 g/mol, A3) possibly low-molecular-weight compounds having number-average molecular weights of 17-400 g/mol selected from the group comprising mono- and polyalcohols, mono- and polyamines, and amino alcohols, A4) isocyanate-reactive, ionically or potentially ionically hydrophilic compounds and/or isocyanate-reactive non-ionically hydrophilic compounds, A5) isocyanate-reactive compounds, which contain at least one $C_7$ to $C_{24}$ alkyl group or $C_7$ to $C_{24}$ alkenyl group, and A6) isocyanate-reactive compounds, which contain at least one polysiloxane group, and B); the NCO groups of the prepolymer that are not yet free are reacted with isocyanate-reactive monoamines, polyamines, hydrazine, and/or hydrazides, dimensioned in such a way that a calculated ratio of the isocyanate-reactive NH groups to the NCO groups of 0.7 to 1.2 is achieved.

13 Claims, No Drawings

AQUEOUS POLYURETHANE-POLYUREA DISPERSIONS

The present invention relates to aqueous polyurethane-polyurea dispersions and to a preparation process therefor which are useful as part of the coating of a flexible sheetlike substrate. They improve the soilability and cleanability of said substrate.

The preparation of aqueous polyurethane-polyurea dispersions by means of the prepolymer ionomer process or the acetone process is long known, for example from Prog. Org. Coat, 9 (1981) 281-340. In either case, a prepolymer comprising isocyanate groups is prepared with or without a solvent and, if necessary, dissolved in solvents after the reaction has been carried out. Next the prepolymer or prepolymer solution is dispersed in water and subjected to a chain extension reaction with polyamines. The extension reaction can be carried out partially or else completely before the dispersing. Finally, the solvent is optionally distilled off.

WO-2009/144157 discloses a process for preparing foam-stabilizing aqueous polyurethane-polyurea dispersions which comprises A) first an NCO-containing polyurethane prepolymer having an NCO functionality of more than one and less than two being prepared by reaction of
A1) polyisocyanates with
A2) polymeric polyols and/or polyamines having number average molecular weights of 400 to 8000 g/mol,
A3) isocyanate-reactive nonionically hydrophilizing compounds,
A4) isocyanate-reactive compounds comprising aliphatic groups,
A5) optionally low molecular weight compounds having number average molecular weights of 17-400 g/mol selected from the group consisting of mono- and polyalcohols, mono- and polyamines and amino alcohols,
A6) optionally isocyanate-reactive ionically or potentially ionically hydrophillizing compounds,
A7) optionally in aliphatic ketones or esters as a solvent,
B) the still free NCO groups of the prepolymer being reacted with isocyanate-reactive monoamines, polyamines, hydrazine and/or hydrazides sufficient to achieve an arithmetic molar ratio in the range from 0.8 to 1.2 for the isocyanate-reactive NH groups to the NCO groups, wherein
C) the prepolymer obtained from step A) is optionally either dissolved in aliphatic ketones or esters or, when the preparation was carried out in the presence of A7), the prepolymer solution is optionally diluted by further addition of aliphatic ketones or esters.

In view of the prior art, it is an object of the present invention to provide a binder that improves the soiling characteristics of flexible sheetlike substrates, more particularly leather. The binder shall further improve the cleanability of flexible sheetlike substrates, more particularly leather.

We have found that this object is achieved, surprisingly, by polyurethane-polyurea dispersions-from the reaction of polyisocyanates with isocyanate-reactive compounds comprising at least one polysiloxane group.

The present invention accordingly provides a process for preparing aqueous polyurethane-polyurea dispersions which comprises
A) first an NCO-containing polyurethane prepolymer being produced by reaction of
A1) polyisocyanates with
A2) polymeric polyols and/or polyamines having number average molecular weights of more than 400 to 8000 g/mol,
A3) optionally low molecular weight compounds having number average molecular weights of 17-400 g/mol selected from the group consisting of mono- and polyalcohols, mono- and polyamines and amino alcohols,
A4) isocyanate-reactive ionically or potentially ionically hydrophilizing compounds and/or isocyanate-reactive nonionically hydrophilizing compounds,
A5) isocyanate-reactive compounds comprising at least one $C_7$- to $C_{24}$-alkyl or $C_7$- to $C_{24}$-alkenyl group, and
A6) isocyanate-reactive compounds comprising at least one polysiloxane group, and
B) the still free NCO groups of the prepolymer being reacted with isocyanate-reactive monoamines, polyamines, hydrazine and/or hydrazides sufficient for an arithmetic ratio of the isocyanate-reactive NH groups to the NCO groups in the range from 0.7 to 1.2.

As an essential component of the present invention, the reaction of isocyanates with isocyanate-reactive compounds comprising at least one polysiloxane group is combined with the reaction of isocyanates with isocyanate-reactive compounds comprising at least one $C_7$- to $C_{24}$-alkyl or $C_7$- to $C_{24}$-alkenyl group.

The present invention further provides for the use of the polyurethane-polyurea dispersions prepared according to the present invention for endowing flexible sheetlike substrates, more particularly leather, with a finish that provides soil repellency and easier cleaning.

The present invention further provides a process for endowing flexible sheetlike substrates, more particularly leather, with a finish that provides soil repellency and easier cleaning by applying the polyurethane-polyurea dispersion of the present invention to the flexible sheetlike substrate, more particularly to the leather.

The present invention further provides aqueous polyurethane-polyurea dispersions preparable by the above process.

Suitable polyisocyanates according to A1) have the formula $X(NCO)_p$, where p is a number from more than 1 to 4, preferably from 2 to 3 and more preferably 2 and X is an aliphatic, cycloaliphatic, aromatic or araliphatic hydrocarbyl radical. Preferably X is an aliphatic hydrocarbyl radical having 3 to 20 carbon atoms, a cycloaliphatic hydrocarbyl radical having 5 to 15 carbon atoms, an aromatic hydrocarbyl radical having 6 to 15 carbon atoms or an araliphatic hydrocarbyl radical having 7 to 15 carbon atoms. When polyisocyanates of the formula $X(NCO)_p$ are used that are mixtures of compounds having different numbers of isocyanate groups, then p is the number average of the isocyanate groups present.

Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethyihexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of 4,4'-diisocyanatodicyclohexylmethane such as the trans/trans, the cis/-cis and the cis/trans isomer, and mixtures of these compounds.

Polymeric polyols or polyamines A2) come typically from the group of polycarbonates, polyesters, polyethers, polyacrylates, polyolefins and polysiloxanes containing hydroxyl or amino groups, as are known from, for example, Ullmann's Encyclopedia of Industrial Chemistry 2005, DOI: 10.1002/14356007.a21_665.pub2 "Polyurethanes", Chapter 3, W. Friederichs.

Suitable polycarbonate polyols are those as may be obtained by, for example, reacting phosgene with an excess of polyhydric alcohols. Examples of suitable dihydric alcohols include ethylene glycol, propane-1,2-diol, propane-1,3-diol, butane-1,2-diol, butane-1,3-diol, butane-1,4-diol, butene-1,4-diol, butyne-1,4-diol, pentane-1,5-diol, neopentyl glycol, 2-butyl-2-ethyl-1,3-propanediol, bis(hydroxymethyl)cyclohexaries such as 1,4-bis(hydroxymethyl)cyclohexane, 2-methylpropane-1,3-diol, methylpentanediols, and also diethylene glycol, triethylene glycol, tetraethylene glycol, polyethylene glycol, dipropylene glycol, polypropylene glycol, dibutylene glycol and polybutylene glycols.

Preferred alcohols are of the general formula HO-$(CH_2)_x$—OH, where x is a number from 1 to 20, preferably an even number from 2 to 20. Examples of such alcohols are ethylene glycol, butane-1,4-diol, hexane-1,6-diol, octane-1,8-diol and dodecane-1,12-diol. Additionally preferred are neopentyl glycol and 2-butyl-2-ethyl-1,3-propanediol.

Proportionally it is also possible to use higher polyhydric alcohols such as glycerol, trimethylolpropane, 1,2,6-hexanetriol, 1,2,4-butanetriol, pentaerythritol, quinital, mannitol and sorbitol.

Also suitable, furthermore, are polyester polyols, which are obtained by reacting polyhydric alcohols with polybasic carboxylic acids. In place of the free polycarboxylic acids it is also possible to use the corresponding polycarboxylic anhydrides or corresponding polycarboxylic esters of lower alcohols, or mixtures thereof, to prepare the polyester polyols. The polycarboxylic acids may be aliphatic, cycloaliphatic, araliphatic, aromatic or heterocyclic and may where appropriate be substituted, by halogen atoms for example, and/or unsaturated. Examples that may be mentioned thereof include the following: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimeric fatty acids. Preferred dicarboxylic acids are of the general formula HOOC—$(CH_2)_y$—COOH, where y is a number from 1 to 20, preferably an even number from 2 to 20, such as succinic acid, adipic acid, sebacic acid and dodecanedicarboxylic acid, for example. Suitable polyhydric alcohols, preferably diols, include the low molecular weight alcohols specified as synthesis components for the polycarbonate polyols.

Also suitable are lactone-based polyester diols, which are homopolymers or copolymers of lactones, preferably hydroxyl-terminal adducts of lactones with suitable polyfunctional starter molecules. Suitable lactones are preferably those deriving from compounds of the general formula HO—$(CH_2)_z$—COON, where z is a number from 1 to 20 and where one hydrogen atom of a methylene unit can also be substituted by a $C_1$ to $C_4$ alkyl radical. Examples are c-caprolactone, β-propiolactone, γ-butyrolactone and/or methyl-ε-caprolactone, and mixtures thereof. Examples of suitable starter components include the low molecular weight polyhydric alcohols specified above as synthesis components for the polycarbonate polyols. The corresponding polymers of c-caprolactone are particularly preferred. Lower polyester diols or polyether diols as well can be used as starters for preparing the lactone polymers. In place of the polymers of lactones it is also possible to use the corresponding, chemically equivalent polycondensates of the hydroxyl carboxylic acids corresponding to the lactones.

Likewise suitable as polyols are polyether diols. They are obtainable in particular by polymerization of ethylene oxide, propylene oxide, butylene oxide, tetrahydrofuran, styrene oxide, epichlorohydrin, or part-fluorinated or perfluorinated derivatives of these compounds, with itself or with themselves, in the presence for example of $BF_3$, or by addition reaction of these compounds, where appropriate in a mixture or in succession, with starter components containing reactive hydrogen atoms, such as alcohols or amines, examples being water, ethylene glycol, propane-1,2-diol, propane-1,3-diol, 1,2-bis(4-hydroxydiphenyl)propane or aniline.

Likewise suitable as monomers are polyhydroxy olefins, preferably those having 2 terminal hydroxyl groups, such as a,w-dihydroxypolybutadiene, α,ω-dihydroxy-polymethacrylic esters or α,ω-dihydroxypolyacrylic esters. Such compounds are known for example from EP 0 622 378 A1. Further suitable polyols are polyacetals, polysiloxanes and alkyd resins.

Suitable low molecular weight compounds according to A3) are the low molecular weight polyhydric alcohols, preferably diols and triols, specified above as synthesis components for the polycarbonate polyols.

In addition, monoalcohols are also suitable, preferably primary or secondary alcohols, such as, for example, methanol, ethanol, propanol, isopropanol, 1-butanol, 2-butanol, isobutanol, 1-hexanol, 1-octanol, 2-ethylhexanol, 1-decanol, 1-dodecanol, 1-tetradecanol, 1-hexadecanol, 1-octadecanol and 1-eicosanol.

Amines or amino alcohols which are obtained, for example, by exchanging the alcohol groups of the alcohols mentioned in the last two paragraphs for amino groups or monoalkylamino groups are likewise suitable.

Ionicaliy or potentially ionically hydrophilizing compounds according to A4) are understood as meaning all compounds which have at least one group reactive towards isocyanate, preferably a hydroxyl or amino group, and at least one functionality which is ionic or potentially ionic. Examples of ionic and potentially ionic groups are —COOY, —$SO_3Y$, —$PO(OY)_2$ (Y for example=H, $NH_4^+$, metal cation), —$NR_2$, —$NR_3^+$ (R=H, alkyl, aryl). Suitable ionically or potentially ionically hydrophilizing compounds are known to the person skilled in the art and are mentioned or explained, for example, in DE 10 2004 002 526 A1 in paragraph [0032].

The isocyanate-reactive nonionically hydrophilizing compounds according to A4) are polyoxyalkylene ethers comprising at least one hydroxyl or amino group. Suitable nonionically hydrophilizing compounds are known to a person skilled in the art and, respectively, named and explained in DE 10 2004 002 526 A1 in paragraphs [0035] to [0039] or else in DE 10 2006 036220 A1.

Isocyanate-reactive alkyl- or alkenyl-containing compounds according to A5) are compounds comprising at least one isocyanate-reactive group—such as alcohol, amine or thiol for example—and at least one $C_7$- to $C_{24}$-alkyl or alkenyl group. They include for example alkyl- or alkenyl-containing mono- or dialcohols, mono- or diamines and amino alcohols. They likewise include alkoxylation products of aliphatic carboxylic acids, carboxamides, phosphoric monoesters, phosphoric diesters, phosphonic acids, phosphonic monoesters, sulfuric monoesters, sulfonic acids, mono- or dialcohols, mono- or diamines or amino alcohols.

In a preferred embodiment, component A5) comprises at least one compound of formula (1)

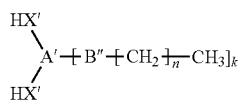

where
X' is O, S, NH or NR,
A', B" are each independently hydrocarbyl groups having 1 to 30 carbon atoms, which may optionally contain heteroatoms selected from N, O, P and/or S, and which are not isocyanate reactive,
n is from 6 to 23, preferably 10-21, more particularly 14-19,
k is 1 or 2.

Preference is given to using monohydroxy, dihydroxy and monoamine compounds comprising aliphatic hydrocarbyl groups. The aliphatic hydrocarbyl groups comprised are preferably unbranched. Particular preference is given to saturated unbranched alkyl groups having 11 to 22 carbon atoms. More particular preference is given to saturated unbranched alkyl groups having 15 to 20 carbon atoms.

Examples of compounds according to A5) are 1-octanol, 1-decanol, 1-dodecanol, 1-hexadecanol, 1-octadecanol, oleyl alcohol, 1-eicosanol and also their alkoxylates prepared by addition reaction of for example ethylene oxide and/or propylene oxide. Preference is given to alkoxylates having fewer than 9 alkoxy units.

Further examples are 1-octylamine, 1-decylamine, 1-dodecylamine, 1-hexadecylamine, 1-octadecylamine, oleylamine, 1-eicosylamine and also their alkoxylates prepared by addition reaction of for example ethylene oxide and/or propylene oxide, wherein the amine nitrogen can be mono- and/or disubstituted by the alkoxylation. Preference is given to using alkoxylates having fewer than 13 alkoxy units.

Compounds according to A5) can also be carboxylic acid alkoxylates or carboxamide alkoxylates, for example prepared from octanoic acid, decanoic acid, dodecanoic acid, hexadecanoic acid, octadecanoic acid, oleic acid, eicosanoic acid, octanoamide, decanoamide, dodecanoamide, hexadecanoamide, octadecanoamide, oleamide or eicosanoamide with for example ethylene oxide and/or propylene oxide. Preference is given to alkoxylates having fewer than 10 alkoxy units.

Other examples are alkoxylates of monoesters or diesters prepared from phosphoric acid or monoesters prepared from sulfuric acid and for example 1-octanol, 1-decanol, 1-dodecanol, 1-hexadecanol, 1-octadecanol, oleyl alcohol, 1-eicosanol and addition of for example ethylene oxide and/or propylene oxide onto these esters. Preference is given to alkoxylates having fewer than 10 alkoxy units.

It is further possible to use alkoxylated aliphatic phosphonic acids, phosphonic monoesters and sulfonic acids whose substituents on the phosphorus, sulfur and ester groups can be for example 1-octyl, 1-decyl, 1-dodecyl, 1-hexadecyl, 1-octadecyl, oleyl or 1-eicosyl groups and whose alkoxylation was conducted with ethylene oxide and/or propylene oxide for example. Preference is given to alkoxylates having fewer than 10 alkoxy units.

Also possible are monoethers—e.g., 1-octyl, 1-dodecyl, 1-hexadecyl, 1-octadecyl, oleyl or 1-eicosyl ethers—of trifunctional alcohols, for example glycerol, trimethylolpropane, pyrogallol, phioroglucine and 1,2,6-hexanetriol, and also the alkoxylates prepared by addition of for example ethylene oxide and/or propylene oxide onto these ethers. Preference is given to using alkoxylates having fewer than 10 alkoxy units.

It is likewise possible to use monoesters—with octanoic acid, decanoic acid, dodecanoic acid, hexadecanoic acid, octadecanoic acid, oleic acid or eicosanoic acid for example—of trifunctional alcohols, for example glycerol, trimethylolpropane, pyrogallol, phioroglucine and 1,2,6-hexanetriol, and also the alkoxylates prepared by addition of for example ethylene oxide and/or propylene oxide onto these esters. Preference is given to using alkoxylates having fewer than 10 alkoxy units, It is similarly possible to use dicarboxylic esters—with octanoic acid, decanoic acid, dodecanoic acid, hexadecanoic acid, octadecanoic acid, oleic acid or eicosanoic acid for example—of tetrafunctional alcohols, for example pentaerythritol, erythritol, threitol or diglycerol, and also the alkoxylates prepared by addition of for example ethylene oxide and/or propylene oxide onto these esters. Preference is given to using alkoxylates having fewer than 10 alkoxy units.

Additional examples are diesters or diamides of dihydroxy dicarboxylic acids e.g., from tartaric acid and 1-octanol, 1-decanol, 1-dodecanol, 1-hexadecanol, 1-octadecanol, oleyl alcohol, 1-eicosanol, 1-octylamine, 1-decylamine, 1-dodecylamine, 1-hexadecylamine, 1-octadecylamine, oleylamine or 1-eicosylamine, and also the alkoxylates prepared by addition of for example ethylene oxide and/or propylene oxide onto these esters and amides respectively. Preference is given to using alkoxylates having fewer than 10 alkoxy units.

It is particularly preferable for component A5) to comprise a compound of formula (2)

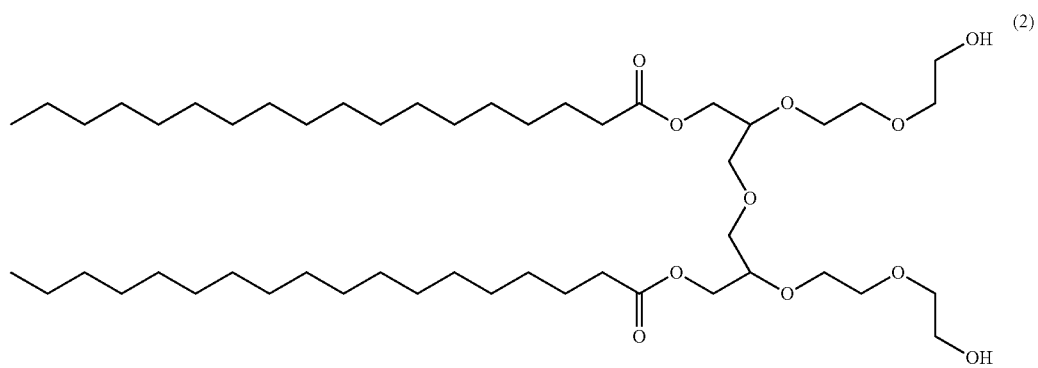 [SMILES: CCCCCCCCCCCCCCCCCC(=O)OCC(COCC(COC(=O)CCCCCCCCCCCCCCCCC)OCCOCCO)OCCOCCO]

The constituents A6) are isocyanate-reactive compounds comprising at least one polysiloxane group.

In a preferred embodiment of the present invention these compounds comprise polysiloxane structural units of formula (3)

where R and R' are hydrocarbyl groups and n averages from 3 to 55. It is further preferable for R and R' to be alkyl or aryl groups and for n to average from 3 to 25. It is particularly preferable for R and R' to be methyl or phenyl groups and for n to average from 6 to 20.

It is further preferable for component A6) to comprise at least one compound of formula (4)

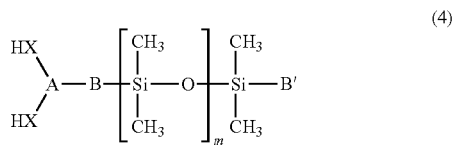

where
X is O, S, NH or NR,
A, B, B' are each independently hydrocarbyl groups having 1 to 30 carbon atoms, which may optionally contain heteroatoms selected from N, O, P and/or S, and which are not isocyanate reactive,
m is from 3 to 55, preferably 4 to 25 and more particularly from 6 to 20

In the process of the present invention, the NCO-containing polyurethane prepolymer is preferably prepared by the reaction of 10% to 45% by weight of component A1), 30% to 80% by weight of component A2), 0% to 10% by weight of component A3), 0.1% to 20% by weight of component A4), 0.1% to 20% by weight of component A5) and 0.1% to 20% by weight of component A6), wherein the sum total of all the components adds up to 100% by weight. A further preferred embodiment utilizes at least 0.1% by weight of A3).

The process of the present invention generally comprises a step in which constituent A1) is mixed with the constituents A2) to A6) and optionally a solvent at below the reaction temperature. The order in which constituent A1), constituents A2) to A6) and, if used, the solvent are added is freely choosable. The reaction of constituent A1) and of constituents A2) to A6) is preferably initiated by temperature elevation. Preferred solvents are ketones or esters, with acetone and methyl acetate being particularly preferred. The reaction is preferably carried out at temperatures in the range from 50 to 120° C.

The reaction of constituent A1) and constituents A2) to A6) can be carried out in the presence or absence of a solvent. In a preferred embodiment of the invention, a prepolymer comprising isocyanate groups is prepared from constituent A1) with constituents A2) to A6) with or without a solvent and, if necessary, dissolved in solvents after the reaction has been carried out. Next the prepolymer or prepolymer solution is dispersed in water. Preferably the prepolymer or prepolymer solution is added to initially charged water or water is added to the initially charged prepolymer solution and a chain extension reaction according to step B) is carried out with polyamines. The extension reaction can be carried out partially or else completely before the dispersing. Finally, the solvent is optionally distilled off.

The present invention process for preparing the aqueous PU dispersions can be carried out in one or more stages in a homogeneous phase or—in the case of a multi-stage reaction—partly in a disperse phase. Complete or partial polyaddition out of A1)-A6) is followed by a dispersing, emulsifying or dissolving step. This is optionally followed by a further polyaddition or modification in disperse phase.

In the process of the present invention, the catalysts known for accelerating the isocyanate addition reaction, for example triethylamine, 1,4-diazabicyclo[2.2.2]octane, dibutyltin oxide, tin dioctoate or dibutyltin dilaurate, tin bis(2-ethylhexanoate) or other organometallic compounds can be included in the initial charge or dosed in later.

Subsequently any of constituents A1)-A6) not added at the beginning of the reaction are dosed in.

In the preparation of the polyurethane prepolymer in step A), the molar amount-of-substance ratio of the total amount of isocyanate groups from A1) to the total amount of isocyanate-reactive groups from A2) to A6) is in the range from 1.0 to 3.5 and preferably in the range from 1.2 to 2.7.

The reaction of components A1)-A6) to form the prepolymer is partial or complete, but preferably complete. The degree of conversion is typically monitored by following the NCO content of the reaction mixture. This can be done using either spectroscopic measurements, examples being infrared or near-infrared spectra, determinations of the refractive index, or else using chemical analyses, such as titrations, on samples taken. In this way, polyurethane prepolymers containing free isocyanate groups are obtained, in bulk (without solvent) or in solution.

During or after the preparation of the polyurethane prepolymers from A1) to A6), and if it has not already been carried out in the starting molecules, the anionically and/or cationically dispersing groups are converted partly or fully to the salt form. In the case of anionic groups this is done using bases such as ammonia, ammonium carbonate or ammonium hydrogen carbonate, trimethylamine, triethylamine, tributylamine, diisopropylethylamine, dimethylethanolamine, diethylethanolamine, triethanolamine, potassium hydroxide or sodium carbonate, preferably triethylamine, triethanolamine, dimethylethanolamine or diisopropylethylamine. The molar amount of substance of the bases is between 50% and 150%, preferably between 85% and 120%, of the amount of substance of the anionic groups. In the case of cationic groups, dimethyl sulfate, succinic acid or formic acid is used. Where only nonionically hydrophilized compounds A3) with ether groups are used, the neutralization step is not needed. Neutralization may also take place simultaneously with dispersion, with the dispersing water already containing the neutralizing agent.

In the subsequent process step, the compounds from B) are reacted with the remaining isocyanate groups. This chain extension/termination can be carried out either in solvent prior to dispersal, during dispersal or preferably in water after dispersal.

Amino alcohols, mono-, di- or polyamines and hydrazine or hydrazides serve for the reaction of the still free NCO groups according to B). Monofunctional compounds for the extension reaction may be amino alcohols and monoamines as mentioned under A3), preferably amino alcohols or long-chain monoamines, such as, for example, ethanolamine, diethanolamine, 1-hexylamine, 1-octylamine, 1-decylamine, 1-dodecylamine, 1-tetradecylamine, 1-hexadecylamine, 1-octadecylamine, 1-eicosylamine. Bi- or polyfunctional compounds which may be used are, for example, ethylenediamine, 1,2- and 1,3-diaminopropane, 1,4-diaminobutane, 1,6-diaminohexane, isophoronediamine, the isomer mixture of 2,2,4- and 2,4,4-trimethylhexamethylenediamine, 2-methylpentamethylenediamine, piperazine, 2,5-dimethylpiperazine, 4,4'-diaminocyclohexylmethane, 1,4-diaminocyclohexane, aminoethylethanolamine, aminopropylethanolamine, sodium (2-aminoethyl)-2-aminoethylsulfonate, diethylenetriamine, triethylenetetramine, tetraethylenepentamine, 1,3- and 1,4-xylylenediamine, α,α,α',α'-tetramethyl-1,3- and 1,4-xylylenediamine and 4,4'-diaminodicyclohexylmethane, dimethylethylenediamine, hydrazine, adipic add dihydrazide or oxalic acid dihydrazide.

The degree of chain extension, i.e., the equivalents ratio of the newly added reactive NH groups of the compounds used for chain extension in B) to free NCO groups of the prepolymer is preferably between 0.8 and 1.2.

Compounds B) can be used in the process of the present invention individually or mixed, optionally diluted with water and/or a solvent, in which case any order of addition is possible in principle.

The polyurethane-polyurea dispersions of the present invention are preferably prepared either by introducing the solvent-free or dissolved prepolymer or the chain-extended polyurethane polymer into the dispersing water, where appropriate with strong shearing, such as vigorous stirring, for example, or, conversely, the dispersing water is stirred into the prepolymer or polymer or solutions thereof.

The dispersions obtained in this way have a solids content of 10% to 70%, preferably 20% to 65% and more preferably 25% to 60% by weight.

Depending on degree of neutralization and ionic group content, the dispersion can be made very finely particulate, so that it has virtually the appearance of a solution; or alternatively, very coarsely particulate formulations are possible that likewise have adequate stability.

The invention further provides mixtures of the polyurethane-polyurea dispersions of the invention with other aqueous binders and crosslinkers which are used for producing coating materials. In this context it is also possible to use the auxiliaries and additives known per se from coating technology, such as thickeners, fillers, pigments, waxes, texture agents, dyes, solvents, flow control assistants, and crosslinkers, for example. Particularly preferred auxiliaries and additives are nanoparticles, partially fluorinated or perfluorinated polymers and silicones. Especially preferred auxiliaries and additives are those described in the following references: DE4328917, DE102004040266, DE19649953, WO2005/078182, U.S. Pat. No. 6,171,515, 4,599,438, 5,385,999, DE4240274.

The present invention further provides coatings of the polyurethane-polyurea dispersions of the present invention and/or their abovementioned mixtures on any desired substrates such as for example metal, wood, glass, glass fibers, carbon fibers, stone, ceramic materials, concrete, rigid and flexible plastics of various kinds, woven and non-woven textiles, leather, split leather, artificial leather, paper, hard fibers, straw and bitumen, which prior to coating may also have been treated with customary primers or after coating may be optionally provided with further coatings.

Preferred substrates are leather and artificial leather. Particularly preferred substrates are full grain and buff leather and also split leather. Preferably coating of the substrate is accomplished wherein the dispersion is not applied as a foam.

The polyurethane-polyureas of the present invention comprise as most important structural elements those of formula (5).

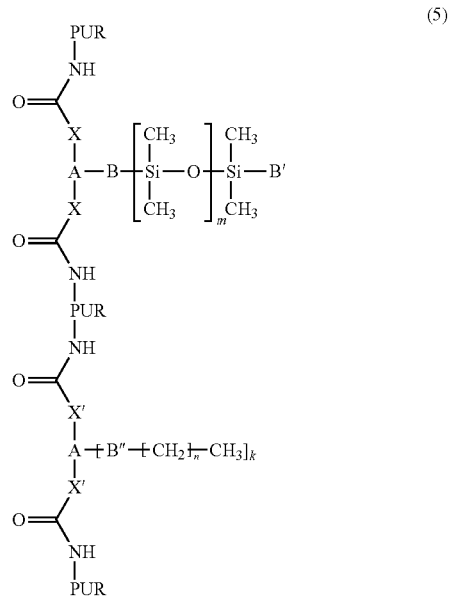

(5)

where
X, X' are independently O, S, NH, NR,
A, A', B, B', B" are each independently hydrocarbyl groups having 1 to 30 carbon atoms, which may optionally contain heteroatoms selected from N, O, P and/or S, and which are not isocyanate reactive,
m is a number from 3 to 55, preferably 4 to 25 and more particularly from 6 to 20,
n is a number from 6 to 23, preferably 10-21 and more particularly 14-19,
PUR is the polyurethane-polyurea formed by the reaction of components A1), A2), A3), A4) and B).

Inserting the structural units as per formula (2) and (4) gives for X=O a structure of formula (6)

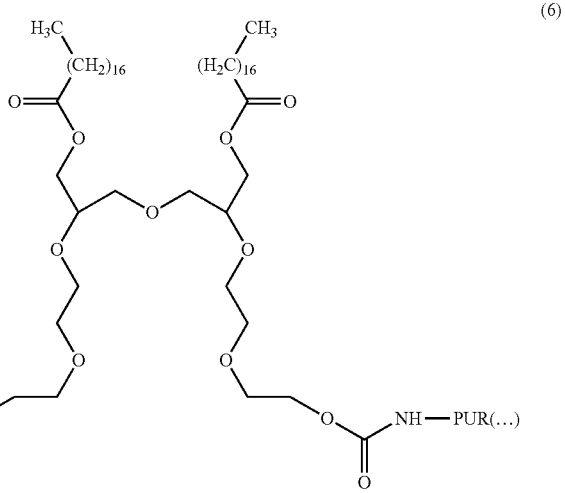

(6)

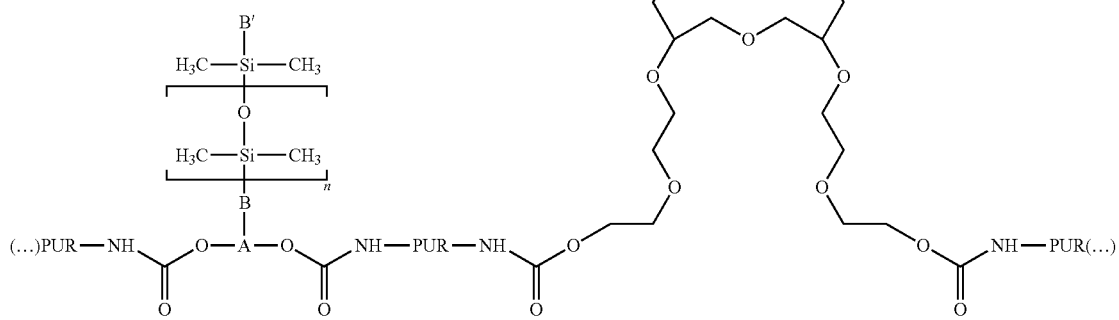

EXAMPLES

Comparative Example PU-1

190.3 g (95 mmol) of polycarbonate diol based on hexanediol (OHN=56) and 14.1 g (105 mmol) of dimethylolpropionic acid are initially charged at 60° C. before adding 85.5 g (385 mmol) of isophorone diisocyanate. The mixture is stirred at about 90° C. for 3 h. Thereafter the NCO value is 5.26% (arithmetic NCO value: 5.36%). To this prepolymer are added 150 g of methyl acetate, and the solution is cooled down to 30° C. Next 10.6 g (105 mmol) of triethylamine are added followed by 484 g of cold water being vigorously stirred into the prepolymer solution for 5 min followed by a further 10 min of stirring. To the dispersion obtained is added during 5 min a solution of 8.62 g (172.4 mmol) of hydrazine monohydrate (corresponds to 95% of the arithmetically necessary quantity of diamine) in 50 g of water followed by 10 min of stirring. Next the methyl acetate is distilled off in vacuo and the solids content adjusted with water to 35% by weight.

Inventive Example PU-2

190.3 g (95 mmol) of polycarbonate diol based on hexanediol (OHN=56), 17.4 g (130 mmol) of dimethylolpropionic acid, 15.0 g (15 mmol) of α-((3-(2,2-bis(hydroxymethyl)butoxy)propyl)dimethylsilyl-ω-((butyldimethylsilyl)oxy)-poly(dimethylsiloxane) having a molecular weight of 1000 g/mol and 18.8 g (21.5 mmol) of diglycerol distearate ethoxylated with on average 4 ethylene oxide units are initially charged at 60° C. before adding 108.8 g (490 mmol) of isophorone diisocyanate. The mixture is stirred at about 90° C. for 3 h. Thereafter the NCO value is 5.03% (arithmetic NCO value: 5.50%). To this prepolymer are added 200 g of methyl acetate, and the solution is cooled down to 30° C. Next 13.6 g (135 mmol) of triethylamine are added followed by 577 g of cold water being vigorously stirred into the prepolymer solution for 5 min followed by a further 10 min of stirring. To the dispersion obtained is added during 5 min a solution of 10.0 g (199.7 mmol) of hydrazine monohydrate (corresponds to 95% of the arithmetically necessary quantity of diamine) in 50 g of water followed by 10 min of stirring. Next the methyl acetate is distilled off in vacuo and the solids content adjusted with water to 35% by weight.

Soiling behavior and cleaning behavior are compared using leathers already finished with a primer coat commercially customary for automotive leather and a beige color coat.

A topcoat is applied by spraying with the following mixtures:

Topcoat T1:
500 g of water, 360 g of PU-1, 40 g of water-dispersible crosslinker comprising isocyanate groups with an isocyanate functionality of >3.

Topcoat T2:
500 g of water, 360 g PU-2, 40 g of water-dispersible crosslinker comprising isocyanate groups with an isocyanate functionality of >3.

T1 and T2 are each applied by spraying twice with a spray gun so that in each case about 15 g/m² of the undried topcoat is present on the leather. Between the two spray applications the coating is dried in a drying duct.

Soilability and cleaning behavior is tested in accordance with the following best practice guide issued by the German Automotive Industry Association (VDA): "VDA 230-212—Leder, Kunststoffbahnenwaren und Textilien fur Kraftfahrzeuge—Bestimmung des Anschmutz- und Reinigungsverhaltens—Verfahren mit Anschmutzgewebe" [Leathers, plastics sheet materials and textiles for motor vehicles—determination of soiling and cleaning behavior—Method using soil cloth]. Part of this best practice guide is the assessment of the degree of soiling according to ISO 105-A03 (gray scale) wherein the soiled peaks are assessed with the naked eye versus unsoiled leather. The degree of soiling is reported on a scale from 1 (badly soiled) to 5 (unsoiled). Soilability is assessed directly after performance of the soiling step. To assess cleaning behavior the test piece is cleaned, and reassessed, in accordance with the best practice guide 24 hours after the soiling step.

A leather treated with T1 attains a degree of soiling equal to 1. After cleaning, the degree of soiling is 2.

A leather treated with T2 attains a degree of soiling equal to 2-3. After cleaning, the degree of soiling is 4.

What is claimed is:

1. A process for coating a flexible sheet-like substrate comprising coating the substrate with an aqueous polyurethane-polyurea dispersion prepared by
    A) a NCO-containing polyurethane prepolymer, wherein the prepolymer is prepared by reacting
        A1) at least one polyisocyanate with
        A2) at least one polymeric polyol and/or polyamine having a number average molecular weight of more than 400 to 8000 g/mol,
        A3) optionally a low molecular weight compound having number average molecular weights of 17-400 g/mol selected from the group consisting of mono- and polyalcohols, mono- and polyamines and amino alcohols,
        A4) at least one isocyanate-reactive ionically or potentially ionically hydrophilizing compound and/or isocyanate-reactive nonionically hydrophilizing compound,
        A5) at least one isocyanate-reactive compound comprising at least one $C_7$- to $C_{24}$-alkyl or $C_7$- to $C_{24}$-alkenyl group, and
        A6) at least one isocyanate-reactive compound comprising at least one compound of formula (4)

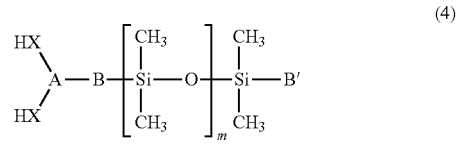

where
X is O, S, NH or NR,
A, B, B' are each independently hydrocarbyl groups having 1 to 30 carbon atoms, which may optionally contain heteroatoms selected from the group consisting of N, O, P and/or S, and which are not isocyanate reactive,
m is from 3 to 55,
and wherein the polysiloxane groups introduced via component A6) are present as side chains, and
    B) the still free NCO groups of the prepolymer having been reacted with isocyanate-reactive monoamines, polyamines, hydrazine and/or hydrazides sufficient for an arithmetic ratio of the isocyanate-reactive NH groups to the NCO groups in the range from 0.7 to 1.2;

wherein the substrate is leather or artificial leather: and
wherein in the coating step the dispersion is not applied as a foam, and wherein the $C_7$- to $C_{24}$-alkyl or $C_7$- to $C_{24}$-alkeyl groups introduced via component A5) are present as side chains.

2. The process according to claim 1, wherein the prepolymer obtained from step A) is either prepared in aliphatic ketones or esters and/or after the reaction in step A) dissolved/diluted in aliphatic ketones or esters.

3. The process according to claim 1, wherein the A1) components are diisocyanates.

4. The process according to claim 1, wherein the A1) components are aliphatic diisocyanates.

5. The process according to claim 1, wherein the A2) to A6) components consist in molar terms to an extent of more than 95% of compounds having one or two isocyanate-reactive groups, and wherein carboxylic acid groups are regarded as isocyanate nonreactive.

6. The process according to claim 1, wherein the NCO-containing polyurethane prepolymer is obtained by reaction of 10% to 45% by weight of component A1), 30% to 80% by weight of component A2), 0% to 10% by weight of component A3), 0.1% to 20% by weight of component A4), 0.1% to 20% by weight of component A5) and 0.1% to 20% by weight of component A6), wherein the sum total of all the components mentioned adds up to 100% by weight.

7. The process according to claim 1, wherein the compounds according to A5) comprise at least one unbranched alkyl or alkenyl chain of 7 to 24 carbons.

8. The process according to claim 7, wherein the compounds according to A5) comprise at least one unbranched saturated alkyl chain of 11 to 22 carbons.

9. The process according to claim 8, wherein the compounds according to A5) comprise at least one unbranched saturated alkyl chain of 15 to 20 carbons.

10. The process according to claim 1 wherein, in the compounds according to A6), m is from 4 to 25.

11. The process according to claim 1 wherein, in the compounds according to A6), m is from 6 to 20.

12. The process according to claim 1 wherein, in the compounds according to A6), B' has at least 2 carbon atoms.

13. A flexible sheet-like substrate coated with a coating according to claim 1.

* * * * *